United States Patent
Jeong et al.

(10) Patent No.: US 11,919,999 B2
(45) Date of Patent: Mar. 5, 2024

(54) METHOD FOR PREPARING POLYETHERKETONEKETONE AND POLYETHERKETONEKETONE PREPARED THEREBY

(71) Applicant: HANWHA CHEMICAL CORPORATION, Seoul (KR)

(72) Inventors: Kwang Seok Jeong, Yongin-si (KR); Min Sung Kim, Seoul (KR); Jae Heon Kim, Seongnam-si (KR); Ju Young Park, Suwon-si (KR); Cho Hee Ahn, Seoul (KR); Byeong Hyeon Lee, Seoul (KR); Sang Hyun Cho, Anyang-si (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 565 days.

(21) Appl. No.: 16/764,896

(22) PCT Filed: Nov. 16, 2018

(86) PCT No.: PCT/KR2018/014084
§ 371 (c)(1),
(2) Date: Jun. 23, 2020

(87) PCT Pub. No.: WO2019/098744
PCT Pub. Date: May 23, 2019

(65) Prior Publication Data
US 2020/0339750 A1    Oct. 29, 2020

(30) Foreign Application Priority Data
Nov. 16, 2017    (KR) ........................ 10-2017-0153251

(51) Int. Cl.
C08G 65/40    (2006.01)
C08G 65/46    (2006.01)
C08J 3/12      (2006.01)
C08K 5/03      (2006.01)

(52) U.S. Cl.
CPC ...... *C08G 65/4012* (2013.01); *C08G 65/4087* (2013.01); *C08G 65/46* (2013.01);
(Continued)

(58) Field of Classification Search
CPC .... C08J 9/00; C08G 65/4012; C08G 65/4087; C08G 65/00; C08G 65/02; C08G 81/00; C08F 10/00
See application file for complete search history.

(56) References Cited

U.S. PATENT DOCUMENTS 4,716,211 A    12/1987  Clendinning et al.
4,774,296 A    9/1988   Clendinning et al.
(Continued)

FOREIGN PATENT DOCUMENTS

EP    0 192 260 A1    8/1986
GB    776326    * 11/1960    ......... C08G 65/4012
(Continued)

OTHER PUBLICATIONS

Doran, Reactor Engineering, 1995, Bioprocess Engineering Principles, pp. 1-59 (Year: 1995).*

(Continued)

*Primary Examiner* — Robert S Walters, Jr.
*Assistant Examiner* — Andrew J Bowman
(74) *Attorney, Agent, or Firm* — Sughrue Mion, PLLC

(57) ABSTRACT

Provided are a method for preparing a polyetherketoneketone and a polyetherketoneketone prepared thereby, wherein, at the time of a polymerization reaction, nitrogen gas is blown into a liquid reaction medium while stirring, thereby quickly removing hydrochloric acid, which is a by-product generated during the reaction, and preventing aggregation of resin particles, thus suppressing the generation of scales.

9 Claims, 2 Drawing Sheets

(52) U.S. Cl.
CPC .................. *C08J 3/12* (2013.01); *C08K 5/03* (2013.01); *C08G 2650/40* (2013.01)

(56) References Cited

U.S. PATENT DOCUMENTS

| | | | |
|---|---|---|---|
| 4,786,694 A | 11/1988 | Clendinning et al. | |
| 4,816,556 A | 3/1989 | Gay et al. | |
| 4,861,915 A | 8/1989 | Clendinning et al. | |
| 4,891,167 A * | 1/1990 | Clendinning | C08G 65/4012 568/333 |
| 4,918,237 A | 4/1990 | Corbin et al. | |
| 5,734,005 A | 3/1998 | Daniels et al. | |
| 9,023,468 B2 | 5/2015 | Towle | |
| 2010/0048750 A1* | 2/2010 | Blom | C09D 133/08 521/142 |
| 2012/0263953 A1 | 10/2012 | Towle | |
| 2016/0009868 A1* | 1/2016 | Ichinose | C08G 69/14 525/437 |

FOREIGN PATENT DOCUMENTS

| | | | |
|---|---|---|---|
| GB | 2 287 031 A | 9/1995 | |
| IN | 201201022 | * 11/2013 | ......... C08G 65/4012 |
| JP | 61-211336 A | 9/1986 | |
| JP | 2-43220 A | 2/1990 | |
| JP | 2-45462 A | 2/1990 | |
| KR | 1995-0000638 B1 | 1/1995 | |
| WO | 8403891 A1 | 10/1984 | |
| WO | 86/06389 A1 | 11/1986 | |
| WO | 2011/004164 A2 | 1/2011 | |
| WO | 2011/004164 A3 | 1/2011 | |

OTHER PUBLICATIONS

Riche et al., The Importance of Water Quality in the Histology Laboratory, 2016, pp. 4-6 (Year: 2016).*
R1, Best Methods of Increasing Cure Speed, Masterbond, 2010, pp. 1-2 (Year: 2010).*
Timperley, C. M. et al., "Best Synthetic Methods: Organophosphorus (V) Chemistry", Elsevier, 2015, pp. 367-368, (1 page).
International Searching Authority, International Search Report dated Mar. 4, 2019 in application No. PCT/KR2018/014084.
Timperley et al., "Best Synthetic Methods: Organophosphorus (V) Chemistry", Chapter 4, Phosphoryl Compounds, Elsevier, 2015, pp. 365-562.

* cited by examiner

METHOD FOR PREPARING POLYETHERKETONEKETONE AND POLYETHERKETONEKETONE PREPARED THEREBY

CROSS REFERENCE TO RELATED APPLICATIONS

This application is a National Stage of Application No. PCT/KR2018/014084, filed on Nov. 16, 2018, claiming priority based on Korean Patent Application No. 10-2017-0153251, filed on Nov. 16, 2017.

TECHNICAL FIELD

The present invention relates to a method for preparing a polyetherketoneketone, and more particularly, to a method for preparing a polyetherketoneketone and a polyetherketoneketone prepared thereby, wherein, at the time of a polymerization reaction, nitrogen gas is blown into a liquid reaction medium while stirring, thereby quickly removing hydrochloric acid that is a by-product generated during the reaction, and preventing aggregation of resin particles, thus suppressing the generation of scales, whereas nitrogen gas is applied by simply purging the nitrogen gas in a reactor in the prior art.

BACKGROUND ART

Polyetherketone is a generic term for known industrial resins and includes polyetherketone, polyetheretherketone, polyetherketoneketone, and a copolymer in which a part of polyetherketoneketone and polyetherketone are mixed.

Since polyetherketoneketone (PEKK) represented by the following formula has high heat resistance and excellent strength, polyetherketoneketone is widely used as engineering plastics. Engineering plastics are used in the fields such as automobiles, aircrafts, electrical and electronic equipment, and machinery, and the range of their applications is gradually expanding.

[Formula]

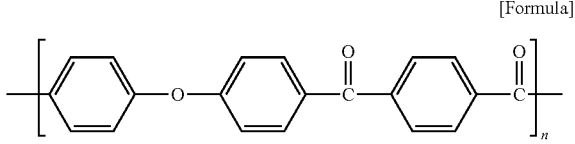

As the range of applications of engineering plastics expands, there is a need for polyetherketone compounds that exhibit more improved physical properties as the use environment becomes more severe. In addition, there is a need for a preparing process that increases the yield in order to reduce costs in a polymerization reaction.

Monomers that are added to a PEKK polymerization reaction are polymerized through a Friedel-Crafts acylation chain reaction. In order to improve the efficiency of the chain reaction, the content of reactants may be increased, the reaction temperature and time may be adjusted, or the amount of a catalyst may be increased. However, a cost problem may be caused. Thus, a method for suppressing the generation of oligomer or scale is considered.

In practice, during a PEKK polymerization reaction, hydrochloric acid (HCl) is generated as a by-product and the reaction efficiency is reduced due to aggregation of resin particles. Accordingly, various technologies have been studied so as to increase the reaction efficiency by removing hydrochloric acid and increasing the dispersion force of the reactants.

In the prior art, a technique for removing reaction by-products by simply purging inert gas in a reactor is known. However, it is difficult to quickly remove hydrochloric acid through such a process, and it is difficult to obtain a resin with high yield due to aggregation of reactant particles.

Korean Patent Registration No. 1995-0000638 discloses a method for preparing 1,4-bis(4-phenoxybenzoyl)benzene (BPBB) using a specific metal-containing catalyst. Korean Patent Registration No. 1995-0000638 relates to a process that does not require an excessive amount of diphenyl ether and does not require a solvent while using a small amount of catalyst. After the catalyst is used, the catalyst can be recovered and reused. Thus, BPBB can be prepared while preventing loss of cost.

U.S. Pat. No. 9,023,468 relates to a process for polymerizing PEKK using three types of monomers, that is, terephthaloyl chloride (TPC), isophthaloyl chloride (IPC), and 1,4-bis(4-phenoxybenzoyl)benzene. $AlCl_3$ is used as a catalyst, but a process for removing by-products generated during a reaction and suppressing the generation of scales is not suggested.

Accordingly, there is a need for a process capable of quickly removing hydrochloric acid, which is a by-product generated during a PEKK polymerization reaction, minimizing the amount of oligomer generated, and preventing the aggregation of resin particles, thereby suppressing the generation of scales.

Therefore, there is a need to develop a PEKK preparing method capable of overcome the above problems and efficiently obtaining a high-molecular-weight resin.

DESCRIPTION OF EMBODIMENTS

Technical Problem

An object of the present invention is to solve the above-described problems.

Another object of the present invention is to provide a method for preparing a polyetherketoneketone, capable of obtaining a high-molecular-weight resin by efficiently removing hydrochloric acid (HCl), which is a by-product of a polymerization reaction.

Another object of the present invention is to provide a method for preparing a polyetherketoneketone, capable of minimizing oligomer in resin particles and preventing aggregation of resin particles, thereby suppressing the generation of scales.

Solution to Problem

In order to achieve the above-described objects of the present invention and achieve the characteristic effects of the present invention described below, the characteristic construction of the present invention is as follows.

A method for preparing a polyetherketoneketone, which obtains a high-molecular-weight polyetherketoneketone with high yield, according to the present invention includes: (a) producing a reaction solution in which at least one selected from diphenyl oxide (DPO) and 1,4-bis(4-phenoxybenzoyl)benzene (EKKE), terephthaloyl chloride (TPC), and isophthaloyl chloride (IPC) are added to a liquid reaction medium and simultaneously dissolved; (b) lowering a temperature of the reaction solution and adding a catalyst to the reaction solution; and (c) directly blowing inert gas into the reaction solution after the catalyst is added and stirring the reaction solution.

The inert gas may be at least one selected from nitrogen, helium, neon, argon, and krypton.

The stirring step may include dispersing the added inert gas by rotating a stirrer having a plurality of stirring blades.

The stirrer may be provided with two or more stirrers in the reactor such that the two or more stirrers rotate in at least two directions to generate a vortex phenomenon.

A nozzle for directly blowing the inert gas into the reaction solution may be formed above or below such that the inert gas is injected in a plurality of directions.

The reaction solution in the step (a) may include at least one capping agent selected from benzoyl chloride, benzenesulfonyl chloride, 4-chlorobiphenyl, 4-phenoxybenzophenone, 4-(4-phenoxyphenoxy)benzophenone, and biphenyl 4-benzenesulfonylphenyl phenyl ether.

The temperature of the reaction solution in the step (b) may be −10° C. to −5° C.

The liquid reaction medium may be at least one solvent selected from O-dichlorobenzene (ODCB) and dichloromethane.

The catalyst may be at least one selected from aluminum chloride ($AlCl_3$), potassium carbonate ($K_2CO_3$), and iron (III) chloride ($FeCl_3$).

The step (c) may include preparing a polymerized PEKK by heating the reactor to 80° C. to 100° C. while stirring.

The polymerized PEKK may be washed methanol ($CH_3OH$), hydrochloric acid, and NaOH solution and rinsed with deionized water (DI water) three times.

The method may further include, after the rinsing step, obtaining a PEKK polymerized resin powder by vacuum drying at 170° C. to 190° C.

The present invention provides a polyetherketoneketone prepared by the above-described preparing method.

Advantageous Effects of Disclosure

A method for preparing a polyetherketoneketone, according to the present invention, can obtain a high-molecular-weight resin by efficiently removing hydrochloric acid, which is a by-product of a polymerization reaction.

A method for preparing a polyetherketoneketone, according to the present invention, can minimize oligomer in resin particles and prevent aggregation of resin particles, thereby suppressing the generation of scales.

BEST MODE

Figure 1:
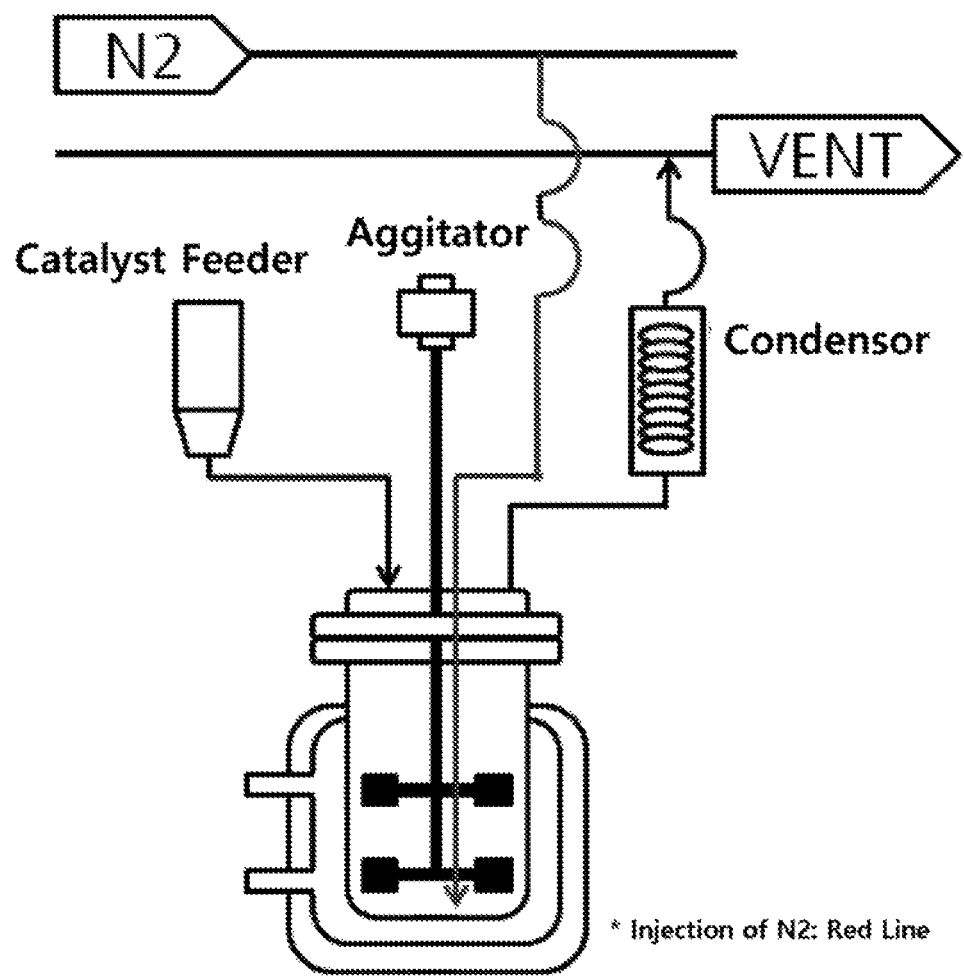
FIGS. 1 and 2 illustrate an apparatus capable of simultaneously flowing and stirring nitrogen gas in a reaction solution in accordance with a method for preparing a polyetherketoneketone according to the present invention.

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment. In addition, it should be understood that the locations or arrangement of individual components in the embodiments can be changed without departing from the spirit and scope of the present invention. Therefore, the following detailed description is not to be taken in a limiting sense, and the scope of the present invention is to be limited only by the appended claims and the entire scope of equivalents thereof, if properly explained. In the drawings, similar reference numerals refer to the same or similar functions throughout various aspects.

Hereinafter, embodiments of the present invention will be described with reference to the accompanying drawings, so that those of ordinary skill in the art can easily carry out the present invention.

The present invention proposes a technology for minimizing the content of oligomer and the generation of scales by promoting a Friedel-Crafts acylation chain reaction of monomers added to the polymerization of polyetherketoneketone (PEKK).

Conventionally, due to a process of applying nitrogen gas ($N_2$) by simply purging the nitrogen gas in a reactor, hydrochloric acid (HCl) is easily generated as a by-product of a polymerization reaction, and scales are generated by low dispersion force of reactant particles.

However, the present invention provides a preparing method capable of quickly removing hydrochloric acid (HCl) generated as a by-product during a reaction by directly blowing inert gas into a liquid reaction medium and preventing aggregation of resin particles, thereby suppressing the generation of scales.

A method for preparing a polyetherketoneketone, which obtains a high-molecular-weight polyetherketoneketone with high yield, according to the present invention, includes: producing a reaction solution in which at least one selected from diphenyl oxide (DPO) and 1,4-bis(4-phenoxybenzoyl) benzene (EKKE), terephthaloyl chloride (TPC), and isophthaloyl chloride (IPC) are added to a liquid reaction medium in a reactor and simultaneously dissolved; lowering a temperature of the reaction solution and adding a catalyst to the reaction solution; and directly blowing inert gas into the reaction solution after the catalyst is added and stirring the reaction solution.

The polyetherketoneketone is a polymer produced by chain polymerization of terephthaloyl represented by the following chemical structure 1 and isophthaloyl represented by the following chemical structure 2, and the properties of the polyetherketoneketone are determined according to a ratio thereof. A terephthaloyl moiety is linear and rigid. An isophthaloyl moiety imparts structural diversity due to its curved structure. The isophthaloyl influences the flexibility, fluidity, and crystallization properties of a polymer chain.

[Chemical Structure 1]

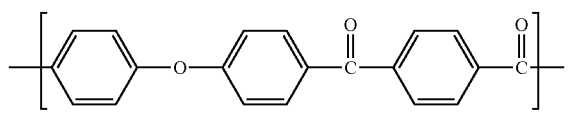

[Chemical Structure 2]

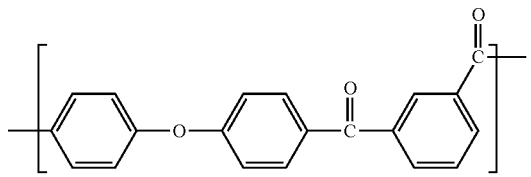

At this time, the inert gas is at least one selected from nitrogen, helium, neon, argon, and krypton. The inert gas may be used alone or in combination during the polymerization reaction.

In the stirring step, a stirrer (agitator) having a plurality of stirring blades rotates to disperse the inert gas added thereto. Two or more stirrers may be provided in the reactor such that the two or more stirrers rotate in at least two directions to generate a vortex phenomenon. A rotational shaft of the stirrer may be provided to alternately rotate at certain angles in forward and reverse directions. In addition, the stirring blades are provided to form a certain angle with the rotational shaft so as to increase the dispersion force of the composition in the reactor.

Figure 2:
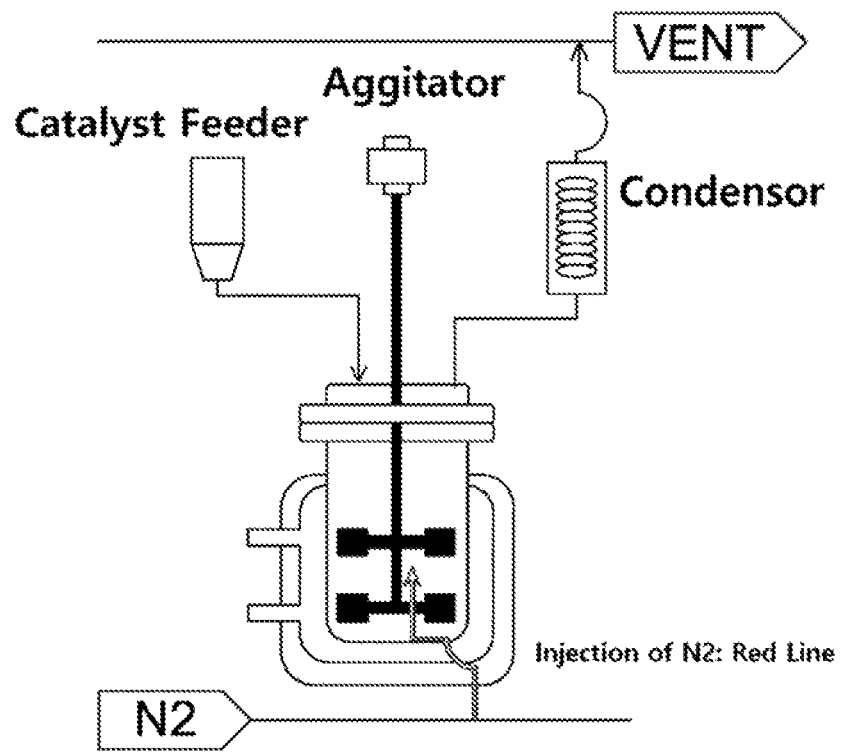

FIGS. 1 and 2 illustrate an apparatus capable of simultaneously flowing and stirring nitrogen gas in a reaction solution in accordance with a method for preparing a polyetherketoneketone according to the present invention. Referring to FIGS. 1 and 2, in the PEKK preparing method according to the present invention, a nozzle for directly blowing the inert gas into the reaction solution may be formed above or below the reactor such that the inert gas is injected in a plurality of directions. Due to this, the hydrochloric acid can be removed more quickly and efficiently by the inert gas.

When three types of monomers are added to the liquid reaction medium and then dissolved, a capping agent may be added and dissolved. At this time, the capping agent is added to the polymerization medium and serves to cap the polymer at one or more ends of the polymer chain. This terminates the continuous extension of the chain and controls the molecular weight of the polymerized polymer. As the capping agent, benzoyl chloride, benzenesulfonyl chloride, 4-chlorobiphenyl, 4-phenoxybenzophenone, 4-(4-phenoxyphenoxy) benzophenone, biphenyl 4-benzenesulfonylphenyl phenyl ether, and the like may be preferably used.

In the preparing method according to the present invention, when the catalyst is added after the temperature of the reaction solution is lowered. At this time, the temperature may be changed according to the catalyst. The range of the temperature may be preferably −10° C. to −5° C.

The catalyst may be at least one selected from aluminum chloride ($AlCl_3$), potassium carbonate ($K2CO_3$), and Iron (III) chloride ($FeCl_3$), but is not limited thereto. Any catalyst may be used as long as the catalyst is commonly used as a catalyst for a Friedel-Crafts acylation polymerization reaction.

In addition, the liquid reaction medium may be at least one solvent selected from O-dichlorobenzene (ODCB) and dichloromethane, but is not limited thereto. Any liquid reaction medium may be used as long as the liquid reaction medium is commonly used as a solvent for a Friedel-Crafts acylation polymerization reaction.

After the inert gas is added, the PEKK is polymerized by heating the reactor to 80° C. to 100° C. while stirring. The polymerization reaction according to the present invention may be performed in various reactors. Preferably, the polymerization reaction may be performed in a continuous stirred tank reactor (CSTR) or a loop reactor.

The PEKK preparing method according to the present invention further includes washing the polymerized PEKK with methanol three times and hydrochloric acid and NaOH solution and rinsing the polymerized PEKK with deionized water (DI water) three times.

After the rinsing step, the PEKK preparing method may further include obtaining a PEKK polymerized resin powder by vacuum drying at 170° C. to 190° C.

The polyetherketoneketone prepared by the preparing method shows improved physical properties, as compared with the polyetherketoneketone prepared through the prior art. In addition, since nitrogen gas is blown and stirred in the reaction medium, the hydrochloric acid that is the reaction by-product is quickly removed and the aggregation of resin particles is prevented to suppress the generation of scales. Therefore, high-molecular-weight polyetherketoneketone may be obtained with high yield.

Hereinafter, the structure and operation of the present invention will be described in more detail with reference to preferred examples of the present invention. However, these example are shown by way of illustration and should not be construed as limiting the present invention in any way.

Since contents not described herein can be sufficiently technically inferred by those of ordinary skill in the art, descriptions thereof will be omitted.

EXAMPLES

Example 1

One monomer selected from diphenyl oxide (DPO) and 1,4-bis(4-phenoxybenzoyl)benzene (EKKE), terephthaloyl chloride (TPC), isophthaloyl chloride (IPC), and benzoyl chloride acting as a capping agent were added to O-dichlorobenzene (ODCB) acting as a reaction solvent and dissolved in a reactor, and the temperature of the reactor was lowered to −10° C. to −5° C. $AlCl_3$ acting as a catalyst was added while a solution temperature was constantly maintained at −10° C. to −5° C. After the catalyst was added, $N_2$ was blown into the solution and a PEKK was polymerized by heating the reactor to 90° C. while stirring the solution. The polymerized resin was washed with methanol three times, 1M hydrochloric acid and 0.5M NaOH solution, rinsed with DI water three times, and vacuum-dried at 180° C. to obtain a PEKK polymerized resin.

Comparative Example 1

A PEKK polymerized resin was obtained in the same manner as in Example 1, except that a solution was stirred while purging $N_2$ in a reactor after a catalyst was added.

<Experimental Example> Gel Permeation Chromatography (GPC) Analysis

The molecular weight and distribution of the PEKK resin prepared according to the present invention were measured by GPC analysis that was performed by dissolving a sample in a solvent in which chloroform and dichloroacetic acid was mixed at a ratio of 9/1 using Waters GPC System (1515 isocratic pump, 2414 RI detector) and Agilent PLgel 10 μm MIXED-B Column, and flowing for 40 minutes at 1 ml per minute.

Table 1 below shows the tensile strength properties of Example 1 and Comparative Example 1.

TABLE 1

| | Measurement results of tensile strength |
|---|---|
| Example 1 | 103 MPa |
| Comparative Example 1 | 91 MPa |

As shown in Table 1, it was confirmed that the PEKK of Example 1 prepared according to the present invention exhibited higher tensile strength than the PEKK of Comparative Example 1 prepared through the conventional nitrogen gas injection technique.

Figure 3:
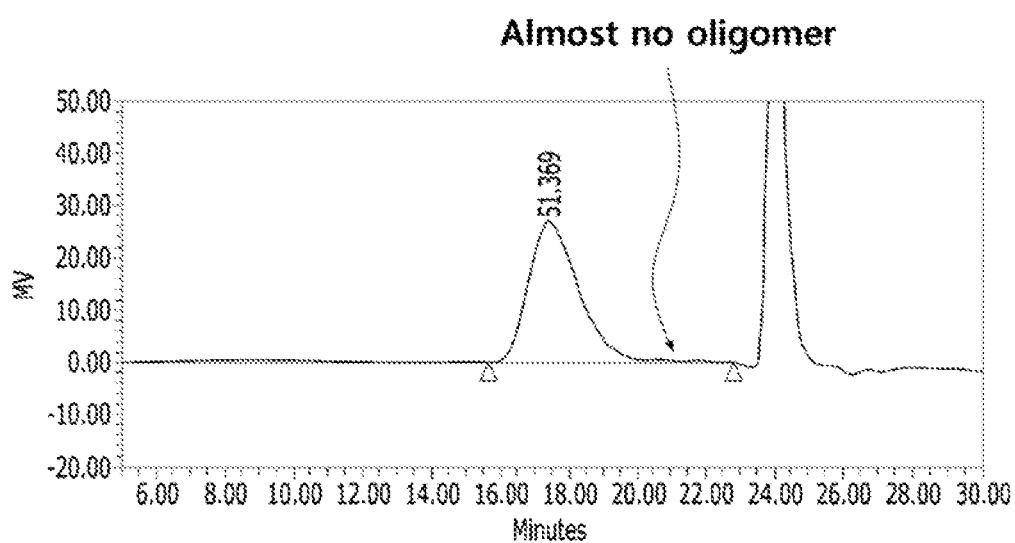
FIG. 3 is a graph showing a result of GPC analysis of a polyetherketoneketone prepared according to the present invention.

In addition, it was confirmed from the GPC analysis results of FIG. 3 that the PEKK of Example 1 prepared according to the present invention had almost no oligomer and was able to obtain a high-molecular-weight resin.

In this manner, it was confirmed that the PEKK polymerized through the preparing method according to the present invention showed improved physical properties and was able to minimize oligomer in the resin particles, thereby increasing the yield.

The method for preparing the polyetherketoneketone, according to the present invention, can obtain the high-molecular-weight resin by efficiently removing hydrochloric acid (HCl), which is the by-product of the polymerization reaction.

Furthermore, the method for preparing the polyetherketoneketone, according to the present invention, has an effect of minimizing oligomer in resin particles and preventing aggregation of resin particles to suppress the generation of scales.

While the present invention has been described by particular matters such as specific components and limited embodiments and drawings, this is provided only for helping the comprehensive understanding of the present invention. The present invention is not limited to the above-described embodiments, and it will be understood by those of ordinary skill in the art that various modifications and variations can be made thereto without departing from the scope of the present invention.

Therefore, it will be understood that the spirit of the present invention should not be limited to the above-described embodiments and the claims and all equivalent modifications fall within the scope of the present invention.

The invention claimed is:

1. A method for preparing a polyetherketoneketone (PEKK), which obtains a high-molecular-weight PEKK with high yield, the method comprising:
    (a) producing a reaction solution in a reactor by introducing into a liquid reaction medium in the reactor (i) at least one selected from diphenyl oxide (DPO) or 1,4-bis(4-phenoxybenzoyl)benzene (EKKE), (ii) terephthaloyl chloride (TPC), and (iii) isophthaloyl chloride (IPC) and dissolving simultaneously the (i) at least one selected from diphenyl oxide (DPO) and 1,4-bis(4-phenoxybenzoyl)benzene (EKKE), the (ii) terephthaloyl chloride (TPC), and the (iii) isophthaloyl chloride (IPC) in the liquid reaction medium;
    (b) lowering a temperature of the reaction solution and adding a catalyst to the reaction solution; and
    (c) directly blowing inert gas into the reaction solution after the catalyst is added and stirring the reaction solution to remove hydrochloric acid (HCl),
    wherein the direct blowing of inert gas in step (c) is carried out through a nozzle provided in the reactor such that the inert gas is injected into the reaction solution in a plurality of directions,
    wherein the stirring in step (c) comprises dispersing the added inert gas by rotating a stirrer having a plurality of stirring blades, and wherein the stirrer is provided with two or more stirrers in the reactor such that the two or more stirrers rotate in at least two directions to generate a vortex.

2. The method of claim 1, wherein the inert gas is at least one selected from nitrogen, helium, neon, argon, or krypton.

3. The method of claim 1, wherein the reaction solution in the step (a) comprises at least one capping agent selected from benzoyl chloride, benzenesulfonyl chloride, 4-chlorobiphenyl, 4-phenoxybenzophenone, 4-(4-phenoxyphenoxy)benzophenone, or biphenyl 4-benzenesulfonylphenyl phenyl ether.

4. The method of claim 1, wherein the temperature of the reaction solution in the step (b) is −10° C. to −5° C.

5. The method of claim 1, wherein the liquid reaction medium is at least one solvent selected from 0-dichlorobenzene (ODCB) or dichloromethane.

6. The method of claim 1, wherein the catalyst is at least one selected from aluminum chloride ($AlCl_3$), potassium carbonate ($K2CO_3$), or iron(III) chloride ($FeCl_3$).

7. The method of claim 1, wherein the step (c) comprises preparing a polymerized PEKK by heating the reactor to 80° C. to 100° C. while stirring.

8. The method of claim 7, wherein the polymerized PEKK is washed with methanol ($CH_3OH$), hydrochloric acid, and a NaOH solution, and rinsed with deionized water (DI water) three times to give a rinsed polymerized PEKK.

9. The method of claim 8, further comprising, after the rinsing step, obtaining a PEKK polymerized resin powder by vacuum drying the rinsed polymerized PEKK at 170° C. to 190° C.

* * * * *